US012744149B2

(12) United States Patent
Kawamura et al.

(10) Patent No.: US 12,744,149 B2
(45) **Date of Patent: *Sep. 22, 2026**

(54) WOUND CORE

(71) Applicant: NIPPON STEEL CORPORATION, Tokyo (JP)

(72) Inventors: Yusuke Kawamura, Tokyo (JP); Takahito Mizumura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 742 days.

This patent is subject to a terminal disclaimer.

(21) Appl. No.: 18/033,131

(22) PCT Filed: Oct. 26, 2021

(86) PCT No.: PCT/JP2021/039560
§ 371 (c)(1),
(2) Date: Apr. 21, 2023

(87) PCT Pub. No.: WO2022/092120
PCT Pub. Date: May 5, 2022

(65) Prior Publication Data

US 2023/0395300 A1 Dec. 7, 2023

(30) Foreign Application Priority Data

Oct. 26, 2020 (JP) ................................ 2020-179266

(51) Int. Cl.
*H01F 27/245* (2006.01)
*C21D 1/74* (2006.01)
(Continued)

(52) U.S. Cl.
CPC ............ *H01F 27/245* (2013.01); *C21D 1/74* (2013.01); *C21D 3/04* (2013.01); *C21D 6/005* (2013.01);
(Continued)

(58) Field of Classification Search
CPC ...... H01F 27/245; H01F 1/14775; H01F 3/02; H01F 41/0233; H01F 1/147; C21D 1/74;
(Continued)

(56) References Cited

U.S. PATENT DOCUMENTS 3,451,130 A * 6/1969 Ellis .................. H01F 27/2455 336/227
6,083,326 A 7/2000 Komatsubara et al.
(Continued)

FOREIGN PATENT DOCUMENTS

AU 2012337260 A1 5/2014
EP 3 101 667 B1 12/2019
(Continued)

*Primary Examiner* — Tuyen T Nguyen
(74) *Attorney, Agent, or Firm* — Birch, Stewart, Kolasch & Birch, LLP

(57) ABSTRACT

This wound core is a wound core including a wound core main body obtained by laminating a plurality of polygonal annular grain-oriented electrical steel sheets in a side view, and the grain-oriented electrical steel sheet has planar portions and bent portions that are alternately continuous in a longitudinal direction, and in at least one bent portion, the crystal grain size Dpx of the grain-oriented electrical steel sheet is 2 W or less.

3 Claims, 7 Drawing Sheets

(51) Int. Cl.

| | |
|---|---|
| ***C21D 3/04*** | (2006.01) |
| ***C21D 6/00*** | (2006.01) |
| ***C21D 8/1216*** | (2026.01) |
| ***C21D 8/1244*** | (2026.01) |
| ***C21D 9/46*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/12*** | (2006.01) |
| ***C22C 38/16*** | (2006.01) |
| ***H01F 1/147*** | (2006.01) |

(52) U.S. Cl.

CPC ........... *C21D 6/008* (2013.01); *C21D 8/1222* (2013.01); *C21D 8/1233* (2013.01); *C21D 8/1255* (2013.01); *C21D 8/1261* (2013.01); *C21D 9/46* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/12* (2013.01); *C22C 38/16* (2013.01); *H01F 1/14775* (2013.01); *C21D 2201/05* (2013.01); *C22C 2202/02* (2013.01)

(58) Field of Classification Search

CPC .......... C21D 3/04; C21D 6/005; C21D 6/008; C21D 8/1222; C21D 8/1233; C21D 8/1255; C21D 8/1261; C21D 9/46; C21D 2201/05; C21D 1/26; C21D 1/76; C21D 8/1272; C21D 8/1294; C21D 8/12; C22C 38/001; C22C 38/002; C22C 38/004; C22C 38/02; C22C 38/04; C22C 38/06; C22C 38/12; C22C 38/16; C22C 2202/02; C22C 38/60

USPC .............................. 336/65, 83, 212, 233–234

See application file for complete search history.

(56) References Cited

U.S. PATENT DOCUMENTS

| | | | | |
|---|---|---|---|---|
| 11,984,249 | B2 * | 5/2024 | Inoue .................. | H01F 41/0233 |
| 12,525,384 | B2 * | 1/2026 | Ushigami ........... | H01F 27/2455 |
| 2013/0213525 | A1 | 8/2013 | Shingaki et al. | |
| 2020/0126709 | A1 | 4/2020 | Mizumura et al. | |
| 2020/0370153 | A1 | 11/2020 | Imamura et al. | |
| 2023/0395293 | A1 * | 12/2023 | Kawamura ............... | H01F 3/02 |
| 2024/0096540 | A1 * | 3/2024 | Kawamura ......... | H01F 1/14775 |

FOREIGN PATENT DOCUMENTS

| | | | | |
|---|---|---|---|---|
| JP | 6-89805 | A | | 3/1994 |
| JP | 7-268474 | A | | 10/1995 |
| JP | 8-134660 | A | | 5/1996 |
| JP | 10-183313 | A | | 7/1998 |
| JP | 2000-114064 | A | | 4/2000 |
| JP | 2001-192785 | A | | 7/2001 |
| JP | 2005-240079 | A | | 9/2005 |
| JP | 2005-286169 | A | | 10/2005 |
| JP | 2012-52229 | A | | 3/2012 |
| JP | 6224468 | B2 | | 11/2017 |
| JP | 2018-148036 | A | | 9/2018 |
| JP | 2018-157142 | A | | 10/2018 |
| TW | I667672 | B | * | 8/2019 |
| WO | WO2013/074268 | A1 | | 5/2013 |
| WO | WO2019/131974 | A1 | | 7/2019 |

* cited by examiner (a)

(b)

WOUND CORE

TECHNICAL FIELD

The present invention relates to a wound core. Priority is claimed on Japanese Patent Application No. 2020-179266, filed Oct. 26, 2020, the content of which is incorporated herein by reference.

BACKGROUND ART

The grain-oriented electrical steel sheet is a steel sheet containing 7 mass % or less of Si and has a secondary recrystallization texture in which secondary recrystallization grains are concentrated in the {110}<001> orientation (Goss orientation). The magnetic properties of the grain-oriented electrical steel sheet greatly influence the degree of concentration in the {110}<001> orientation. In recent years, grain-oriented electrical steel sheets that have been put into practical use are controlled so that the angle between the crystal <001> direction and the rolling direction is within a range of about 5°.

Grain-oriented electrical steel sheets are laminated and used in iron cores of transformers, and as their main magnetic properties such as a high magnetic flux density and a low iron loss are required. It is known that the crystal orientation has a strong correlation with these properties, and for example, Patent Documents 1 to 3 disclose a precise orientation control technique.

In addition, the influence of the crystal grain size in the grain-oriented electrical steel sheet is well known, and Patent Documents 4 to 7 disclose a technique for improving properties by controlling the crystal grain size.

In addition, in the related art, for wound core production as described in, for example, Patent Document 8, a method of winding a steel sheet into a cylindrical shape, then pressing the cylindrical laminated body without change so that the corner portion has a constant curvature, forming it into a substantially rectangular shape, then performing annealing to remove strain, and maintaining the shape is widely known.

On the other hand, as another method of producing a wound core, techniques such as those found in Patent Documents 9 to 11 in which portions of steel sheets that become corner portions of a wound core are bent in advance so that a relatively small bent area with a radius of curvature of 3 mm or less is formed and the bent steel sheets are laminated to form a wound core are disclosed. According to this production method, a conventional large-scale pressing process is not required, the steel sheet is precisely bent to maintain the shape of the iron core, and processing strain is concentrated only in the bent portion (corner) so that it is possible to omit strain removal according to the above annealing process, and its industrial advantages are great and the applications thereof are expanding.

CITATION LIST

Patent Document

[Patent Document 1]
Japanese Unexamined Patent Application, First Publication No. 2001-192785
[Patent Document 2]
Japanese Unexamined Patent Application, First Publication No. 2005-240079

[Patent Document 3]
Japanese Unexamined Patent Application, First Publication No. 2012-052229
[Patent Document 3]
Japanese Unexamined Patent Application, First Publication No. H6-89805
[Patent Document 5]
Japanese Unexamined Patent Application, First Publication No. H8-134660
[Patent Document 6]
Japanese Unexamined Patent Application, First Publication No. H10-183313
[Patent Document 7]
WO 2019/131974
[Patent Document 8]
Japanese Unexamined Patent Application, First Publication No. 2005-286169
[Patent Document 9]
Japanese Patent No. 6224468
[Patent Document 10]
Japanese Unexamined Patent Application, First Publication No. 2018-148036
[Patent Document 11]
Australian Patent Application Publication No. 2012337260

SUMMARY OF THE INVENTION

Problems to be Solved by the Invention

An object of the present invention is to provide a wound core produced by a method of bending steel sheets in advance so that a relatively small bent area having a radius of curvature of 5 mm or less is formed and laminating the bent steel sheets to form a wound core, and the wound core is improved so that deterioration of efficiency due to a combination of the shape of the iron core and the steel sheet used is minimized.

Means for Solving the Problem

The inventors studied details of efficiency of a transformer iron core produced by a method of bending a steel sheet in advance so that a relatively small bent area having a radius of curvature of 5 mm or less is formed and laminating the bent steel sheets to form a wound core. As a result, they recognized that, even if steel sheets with substantially the same crystal orientation control and substantially the same magnetic flux density and iron loss measured with a single sheet are used as a material, there is a difference in iron core efficiency.

After investigating the cause, it was found that the difference in efficiency that is a problem is caused by the influence of the crystal grain size of the material. In addition, it was found that the degree in phenomenon (that is, the difference in iron core efficiency) also varies depending on the sizes and shapes of the iron core. In addition, when this phenomenon was studied in detail, particularly, it was speculated that the cause is the difference in the degree of iron loss deterioration due to bending.

In this regard, various steel sheet production conditions and iron core shapes were studied, and the influences on iron core efficiency were classified. As a result, the result in which steel sheets produced under specific production conditions are used as iron core materials having specific sizes and shapes, and thus the iron core efficiency can be controlled so that it becomes the optimal efficiency according to magnetic properties of the steel sheet material was obtained.

The gist of the present invention, which has been made to achieve the above object, is as follows.

A wound core according to one embodiment of the present invention is a wound core including a wound core main body obtained by laminating a plurality of polygonal annular grain-oriented electrical steel sheets in a sheet thickness direction in a side view, wherein the grain-oriented electrical steel sheet has planar portions and bent portions that are alternately continuous in a longitudinal direction, the bent portion in a side view has an inner radius of curvature r of 1 mm or more and 5 mm or less, the grain-oriented electrical steel sheet has a chemical composition containing, in mass %, Si: 2.0 to 7.0%, with the remainder being Fe and impurities, and has a texture oriented in the Goss orientation, and in at least one of the bent portions, the crystal grain size Dpx (mm) of the laminated grain-oriented electrical steel sheet is 2 W or less.

Here, Dpx is the average value of Dp obtained by the following Formula (1),

Dc (mm) is the average crystal grain size in a direction in which a boundary line extends (hereinafter referred to as a "boundary direction") at respective boundaries between the bent portion and two planar portions arranged with the bent portion therebetween, Dl (mm) is the average crystal grain size in a direction perpendicular to the boundary direction at the boundary, and W (mm) is the width of the bent portion in a side view.

In addition, the average value of Dp is the average value of Dp on the inner side and Dp on the outer side of one planar portion between two planar portions and Dp on the inner side and Dp on the outer side of the other planar portion.

$$Dp=\sqrt{(Dc\times Dl/\pi)} \quad (1)$$

In addition, a wound core according to another embodiment of the present invention is a wound core including a wound core main body obtained by laminating a plurality of polygonal annular grain-oriented electrical steel sheets in a sheet thickness direction in a side view, wherein the grain-oriented electrical steel sheet has planar portions and bent portions that are alternately continuous in a longitudinal direction, the bent portion in a side view has an inner radius of curvature r of 1 mm or more and 5 mm or less, the grain-oriented electrical steel sheet has a chemical composition containing, in mass %, Si: 2.0 to 7.0%, with the remainder being Fe and impurities, and has a texture oriented in the Goss orientation, in at least one of the bent portions, the crystal grain size Dpy (mm) of the laminated grain-oriented electrical steel sheet is 2 W or less, where Dpy is the average value of DI, Dl (mm) is the average crystal grain size in a direction perpendicular to the boundary direction at respective boundaries between the bent portion and two planar portions arranged with the bent portion therebetween, and W (mm) is the width of the bent portion in a side view.

In addition, the average value of Dl is the average value of Dl on the inner side and Dl on the outer side of one planar portion between two planar portions and Dl on the inner side and Dl on the outer side of the other planar portion.

In addition, still another embodiment of the present invention provides a wound core including a wound core main body obtained by laminating a plurality of polygonal annular grain-oriented electrical steel sheets in a sheet thickness direction in a side view, wherein the grain-oriented electrical steel sheet has planar portions and bent portions that are alternately continuous in a longitudinal direction, the bent portion in a side view has an inner radius of curvature r of 1 mm or more and 5 mm or less, the grain-oriented electrical steel sheet has a chemical composition containing, in mass %, Si: 2.0 to 7.0%, with the remainder being Fe and impurities, and has a texture oriented in the Goss orientation, in at least one of the bent portions, the crystal grain size Dpz (mm) of the laminated grain-oriented electrical steel sheet is 2 W or less.

Here, Dpz is the average value of Dc,

Dc (mm) is the average crystal grain size in a boundary direction at respective boundaries between the bent portion and two planar portions arranged with the bent portion therebetween, W (mm) is the width of the bent portion in a side view.

In addition, the average value of Dc is the average value of Dc on the inner side and Dc on the outer side of one planar portion between two planar portions and Dc on the inner side and Dp on the outer side of the other planar portion.

Effects of the Invention

According to the present invention, in the wound core formed by laminating the bent grain-oriented electrical steel sheets, it is possible to effectively minimize deterioration of efficiency due to a combination of the shape of the iron core and the steel sheet used.

EMBODIMENT(S) FOR IMPLEMENTING THE INVENTION

Figure 1:
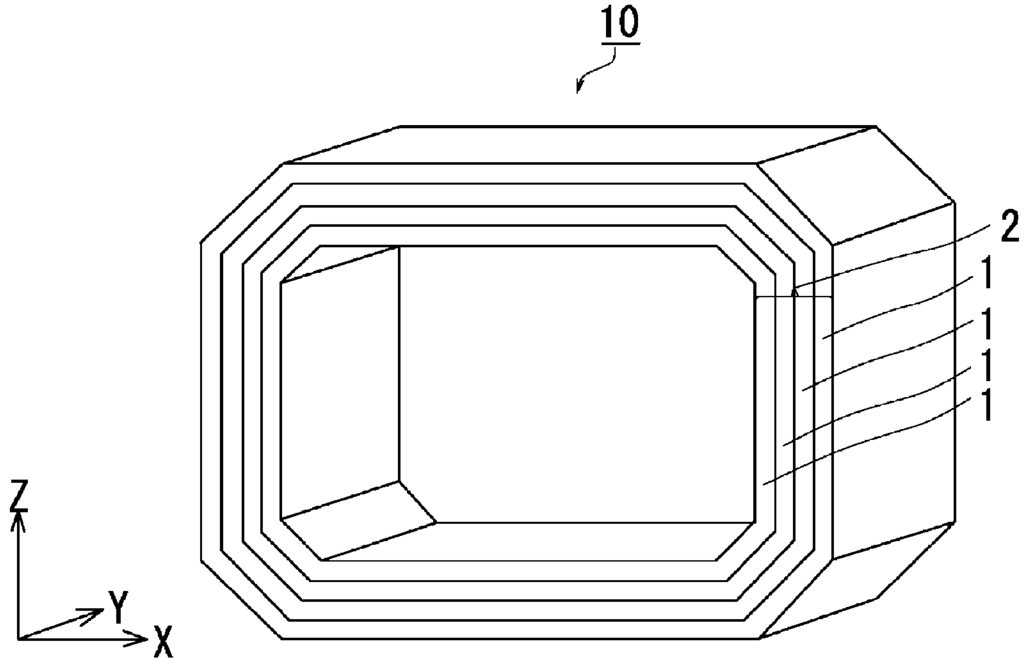
FIG. 1 is a perspective view schematically showing a wound core according to one embodiment of the present invention.

Hereinafter, a wound core according to one embodiment of the present invention will be described in detail in order. However, the present invention is not limited to only the configuration disclosed in the present embodiment, and can be variously modified without departing from the gist of the present invention. Here, lower limit values and upper limit values are included in the numerical value limiting ranges described below. Numerical values indicated by "more than" or "less than" are not included in these numerical value ranges. In addition, unless otherwise specified, "%" relating to the chemical composition means "mass %."

In addition, terms such as "parallel," "perpendicular," "identical," and "right angle" and length and angle values used in this specification to specify shapes, geometric conditions and their extents are not bound by strict meanings, and should be interpreted to include the extent to which similar functions can be expected.

In addition, in this specification, "grain-oriented electrical steel sheet" may be simply described as "steel sheet" or "electrical steel sheet" and "wound core" may be simply described as "iron core."

A wound core according to the present embodiment is a wound core including a wound core main body obtained by laminating a plurality of polygonal annular grain-oriented electrical steel sheets in a sheet thickness direction in a side view,

- wherein the grain-oriented electrical steel sheet has planar portions and bent portions that are alternately continuous in a longitudinal direction,
- the bent portion in a side view has an inner radius of curvature r of 1 mm or more and 5 mm or less,
- the grain-oriented electrical steel sheet has a chemical composition containing,
- in mass %,
- Si: 2.0 to 7.0%, with the remainder being Fe and impurities, and
- has a texture oriented in the Goss orientation, and
- in at least one of the bent portions, the crystal grain size Dpx (mm) of the laminated grain-oriented electrical steel sheet is 2 W or less.

Here Dpx (mm) is the average value of Dp (mm) obtained by the following Formula (1),

- Dc (mm) is the average crystal grain size in a boundary direction at respective boundaries between the bent portion and two planar portions arranged with the bent portion therebetween,
- Dl (mm) is the average crystal grain size in a direction perpendicular to the boundary direction, and
- W (mm) is the width of the bent portion in a side view.

In addition, the average value of Dp is the average value of Dp on the inner side and Dp on the outer side of one planar portion between two planar portions and Dp on the inner side and Dp on the outer side of the other planar portion.

$$Dp=\sqrt{(Dc\times Dl/\pi)} \quad (1)$$

1. Shape of Wound Core and Grain-Oriented Electrical Steel Sheet

First, the shape of a wound core of the present embodiment will be described. The shapes themselves of the wound core and the grain-oriented electrical steel sheet described here are not particularly new. For example, they merely correspond to the shapes of known wound cores and grain-oriented electrical steel sheets introduced in Patent Document 9 to 11 in the related art.

Figure 2:
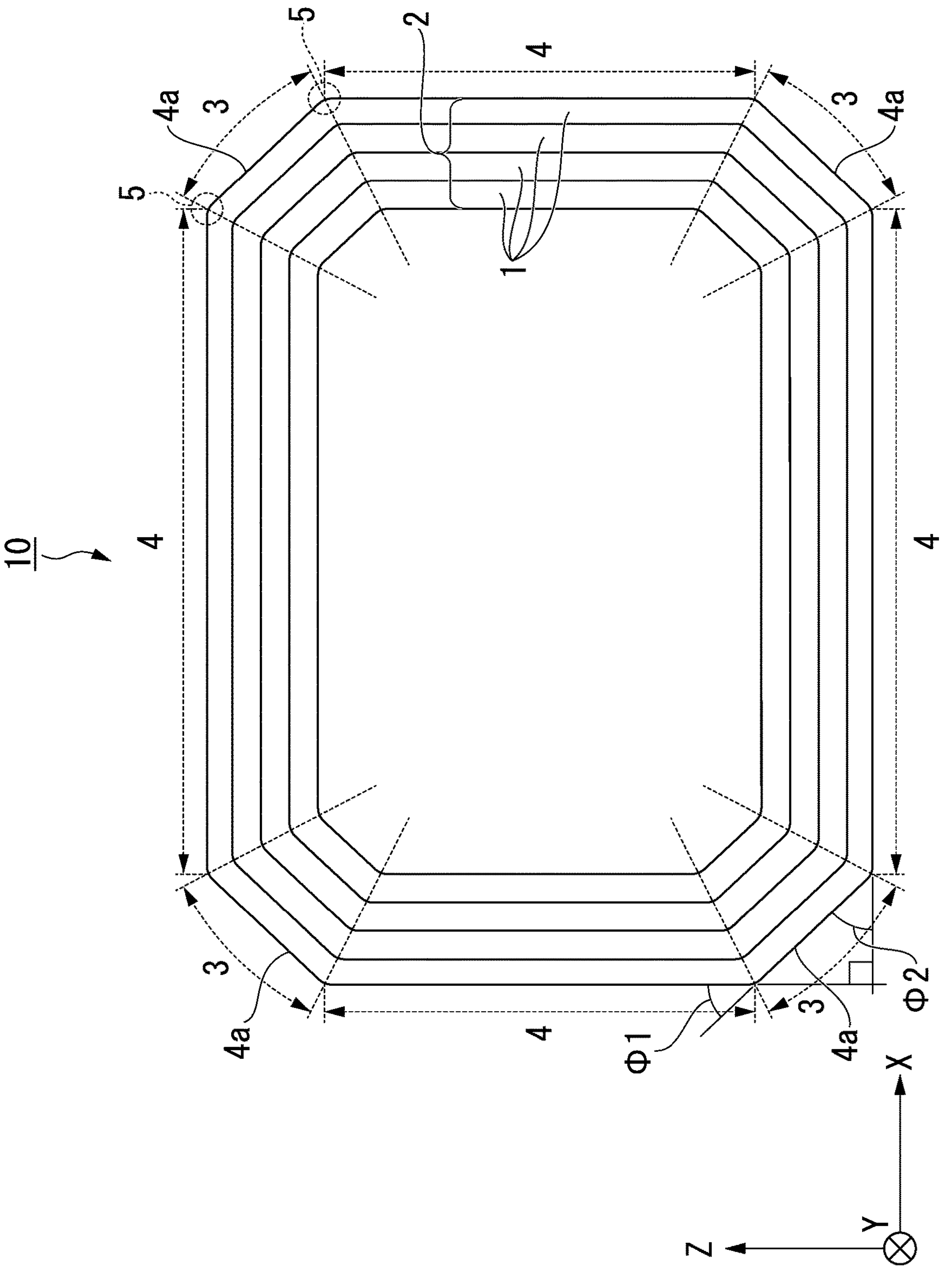
FIG. 2 is a side view of the wound core shown in the embodiment of FIG. 1.
Figure 3:
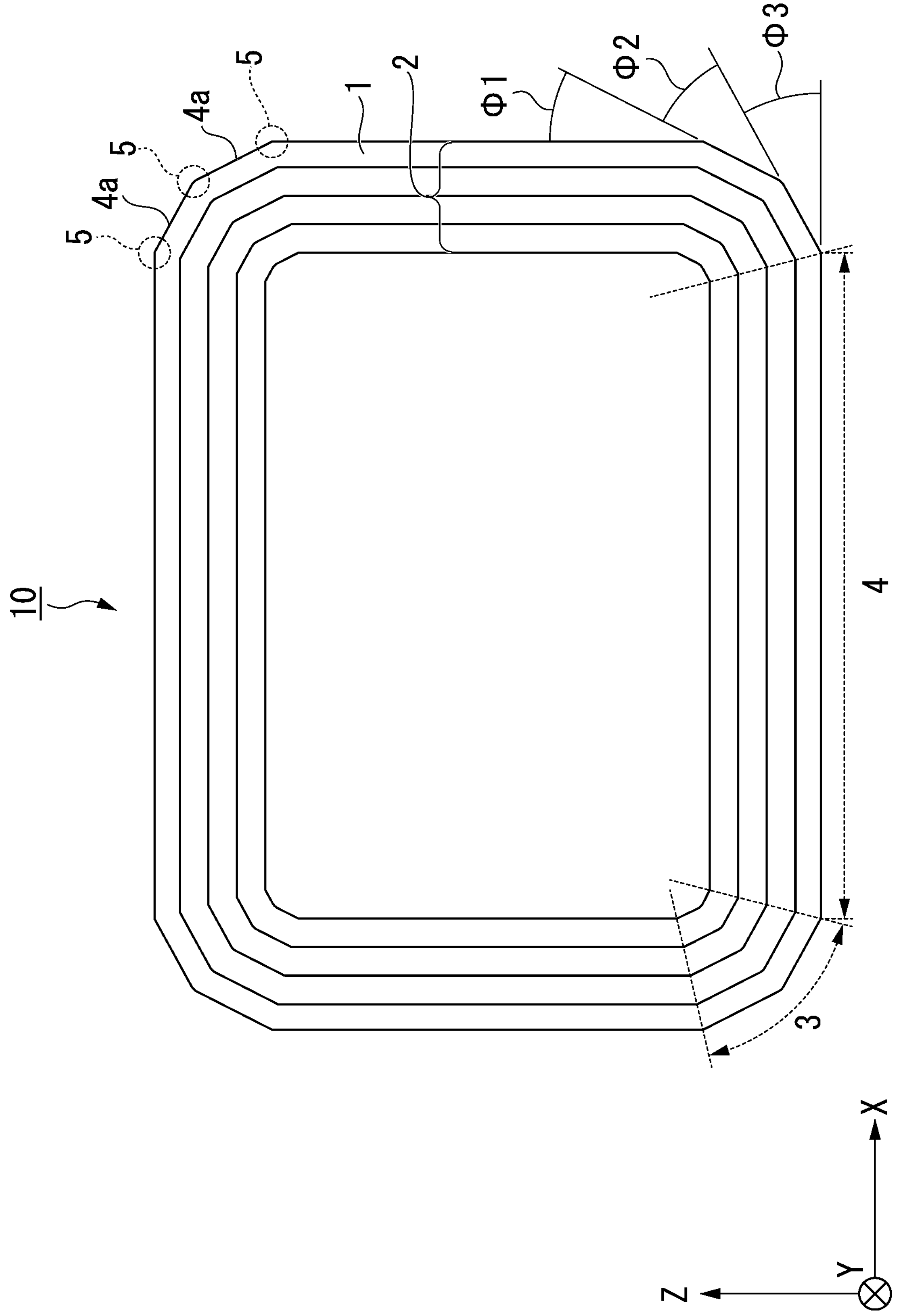
FIG. 3 is a side view schematically showing a wound core according to another embodiment of the present invention.

FIG. 1 is a perspective view schematically showing a wound core according to one embodiment. FIG. 2 is a side view of the wound core shown in the embodiment of FIG. 1. In addition, FIG. 3 is a side view schematically showing another embodiment of the wound core.

Here, in the present embodiment, the side view is a view of the long-shaped grain-oriented electrical steel sheet constituting the wound core in the width direction (Y-axis direction in FIG. 1). The side view is a view showing a shape visible from the side (a view in the Y-axis direction in FIG. 1).

The wound core according to the present embodiment includes a wound core main body 10 in a side view in which a plurality of polygonal annular (rectangular or polygonal) grain-oriented electrical steel sheets 1 are laminated in a sheet thickness direction. The wound core main body 10 has a polygonal laminated structure 2 in a side view in which the grain-oriented electrical steel sheets 1 are stacked in a sheet thickness direction. The wound core main body 10 may be used as a wound core without change or may include, as necessary, for example, a known fastener such as a binding band for integrally fixing the plurality of stacked grain-oriented electrical steel sheets 1.

In the present embodiment, the iron core length of the wound core main body 10 is not particularly limited. Even if the iron core length of the iron core changes, the volume of a bent portion 5 is constant so that the iron loss generated in the bent portion 5 is constant. If the iron core length is longer, the volume ratio of the bent portion 5 to the wound core main body 10 is smaller and the influence on iron loss deterioration is also small. Therefore, a longer iron core length of the wound core main body 10 is preferable. The iron core length of the wound core main body 10 is preferably 1.5 m or more and more preferably 1.7 m or more. Here, in the present embodiment, the iron core length of the wound core main body 10 is the circumferential length at the central point in the laminating direction of the wound core main body 10 in a side view.

The wound core of the present embodiment can be suitably used for any conventionally known application. Particularly, when it is applied to the iron core for a transmission transformer in which the efficiency of the iron core is a problem, significant advantages can be exhibited.

As shown in FIGS. 1 and 2, the wound core main body 10 includes a portion in which the grain-oriented electrical steel sheets 1 in which first planar portions 4 and corner portions 3 are alternately continuous in the longitudinal direction and the angle formed by two adjacent first planar portions 4 at each corner portion 3 is 90° are stacked in a sheet thickness direction and has a substantially rectangular laminated structure 2 in a side view. In addition, from another point of view, the wound core main body 10 shown in FIGS. 1 and 2 has an octagonal laminated structure 2. The wound core main body 10 according to the present embodiment has an octagonal laminated structure, but the present invention is not limited thereto, and in the wound core main body, in a side view, a plurality of polygonal annular grain-oriented electrical steel sheets are laminated in a sheet thickness direction, and in the grain-oriented electrical steel sheets, planar portions and bent portions may be alternately continuous in the longitudinal direction (the circumferential direction).

Hereinafter, the wound core main body 10 having substantially a rectangular shape including four corner portions 3 will be described.

Each corner portion 3 of the grain-oriented electrical steel sheet 1 in a side view includes two or more bent portions 5 having a curved shape and a second planar portion 4a between the adjacent bent portions 5 and 5. Therefore, the corner portion 3 has a configuration including two or more bent portions 5 and one or more second planar portions 4a. In addition, the sum of the bent angles of two bent portions 5 and 5 present in one corner portion 3 is 90°.

In addition, as shown in FIG. 3, each corner portion 3 of the grain-oriented electrical steel sheet 1 in a side view includes three bent portions 5 having a curved shape and the second planar portion 4a between the adjacent bent portions 5 and 5 and the sum of the bent angles of three bent portions, 5, 5 and 5 present in one corner portion 3 is 90°.

In addition, each corner portion 3 may include four or more bent portions. In this case also, the second planar portion 4a is provided between the adjacent bent portions 5 and 5, and the sum of the bent angles of four or more bent portions 5 present in one corner portion 3 is 90°. That is, the corner portions 3 according to the present embodiment are arranged between two adjacent first planar portions 4 and 4 arranged at right angles and include two or more bent portions 5 and one or more second planar portions 4a.

In addition, in the wound core main body 10 shown in FIG. 2, the bent portion 5 is arranged between the first planar portion 4 and the second planar portion 4a, but in the wound core main body 10 shown in FIG. 3, the bent portion 5 is arranged between the first planar portion 4 and the second planar portion 4a and between two second planar portions 4a and 4a. That is, the second planar portion 4a may be arranged between two adjacent second planar portions 4a and 4a.

In addition, in the wound core main body 10 shown in FIG. 2 and FIG. 3, the first planar portion 4 has a longer length than the second planar portion 4a in the longitudinal direction (the circumferential direction of the wound core main body 10), but the first planar portion 4 and the second planar portion 4a may have the same length.

Here, in this specification, "first planar portion" and "second planar portion" each may be simply referred to as "planar portion."

Each corner portion 3 of the grain-oriented electrical steel sheet 1 in a side view includes two or more bent portions 5 having a curved shape, and the sum of the bent angles of the bent portions present in one corner portion is 90°. The corner portion 3 includes the second planar portion 4a between the adjacent bent portions 5 and 5. Therefore, the corner portion 3 has configuration including two or more bent portions 5 and one or more second planar portions 4a.

The embodiment of FIG. 2 includes two bent portions 5 in one corner portion 3. The embodiment of FIG. 3 includes three bent portions 5 in one corner portion 3.

As shown in these examples, in the present embodiment, one corner portion can be formed with two or more bent portions, but in order to minimize the occurrence of distortion due to deformation during processing and minimize the iron loss, the bent angle φ (φ1, φ2, φ3) of the bent portion 5 is preferably 60° or less and more preferably or less.

In the embodiment of FIG. 2 including two bent portions in one corner portion, in order to reduce the iron loss, for example, φ1=60° and φ2=30° and φ1=45° and φ2=45° can be set. In addition, in the embodiment of FIG. 3 including three bent portions in one corner portion, in order to reduce the iron loss, for example, φ1=30°, φ2=30° and φ3=30° can be set. In addition, in consideration of production efficiency, since it is preferable that folding angles (bent angles) be equal, when one corner portion includes two bent portions, φ1=45° and φ2=45° are preferable. In addition, in the embodiment of FIG. 3 including three bent portions in one corner portion, in order to reduce the iron loss, for example, φ1=30°, φ2=30° and φ3=30° are preferable.

Figure 6:
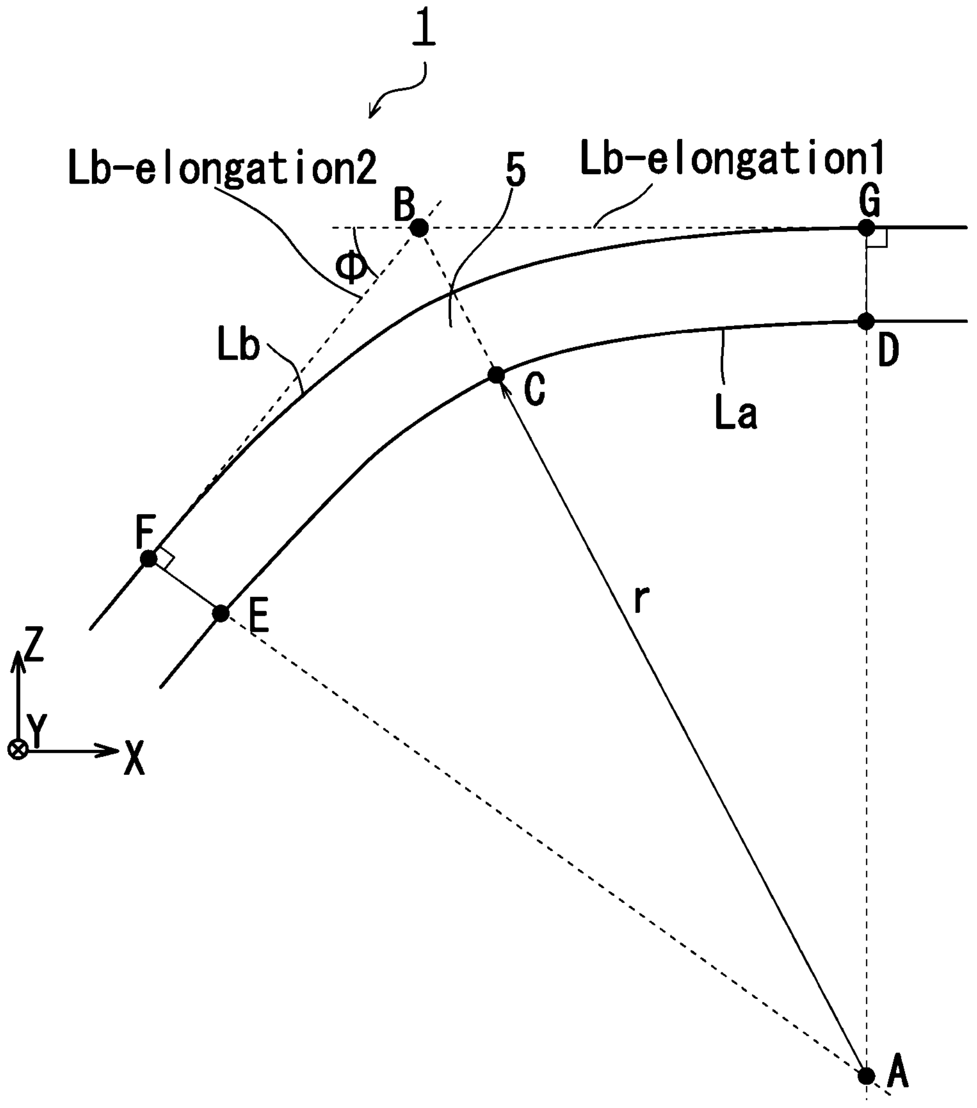
FIG. 6 is a side view schematically showing an example of a bent portion of a grain-oriented electrical steel sheet constituting the wound core according to the present invention.

The bent portion 5 will be described in more detail with reference to FIG. 6. FIG. 6 is a diagram schematically showing an example of the bent portion (curved portion) of the grain-oriented electrical steel sheet. The bent angle of the bent portion 5 is the angle difference occurring between the rear straight portion and the front straight portion in the bending direction at the bent portion 5 of the grain-oriented electrical steel sheet 1, and is expressed, on the outer surface of the grain-oriented electrical steel sheet 1, as an angle φ that is a supplementary angle of the angle formed by two virtual lines Lb-elongation1 and Lb-elongation2 obtained by extending the straight portion that are surfaces of the planar portions 4 and 4a on both sides of the bent portion 5. In this case, the point at which the extended straight line separates from the surface of the steel sheet is the boundary between the planar portions 4 and 4a and the bent portion 5 on the outer surface of the steel sheet, which is the point F and the point G in FIG. 6.

In addition, straight lines perpendicular to the outer surface of the steel sheet extend from the point F and the point G, and intersections with the inner surface of the steel sheet are the point E and the point D. The point E and the point D are the boundaries between the planar portions 4 and 4a and the bent portion 5 on the inner surface of the steel sheet.

Here, in the present embodiment, in a side view of the grain-oriented electrical steel sheet 1, the bent portion 5 is a portion of the grain-oriented electrical steel sheet 1 surrounded by the point D, the point E, the point F, and the point G. In FIG. 6, the surface of the steel sheet between the point D and the point E, that is, the inner surface of the bent portion 5, is indicated by La, and the surface of the steel sheet between the point F and the point G, that is, the outer surface of the bent portion 5, is indicated by Lb. In addition, FIG. 6 shows the inner radius of curvature r (hereinafter simply referred to as a radius of curvature r) of the bent portion 5 in a side view. The radius of curvature r of the bent portion 5 is obtained by approximating the above La with an arc passing through the point E and the point D. A smaller radius of curvature r indicates a sharper curvature of the curved portion of the bent portion 5, and a larger radius of curvature r indicates a gentler curvature of the curved portion of the bent portion 5.

In the wound core of the present embodiment, the radius of curvature r at each bent portion 5 of the grain-oriented electrical steel sheets 1 laminated in the sheet thickness direction may vary to some extent. This variation may be a variation due to molding accuracy, and it is conceivable that an unintended variation may occur due to handling during lamination. Such an unintended error can be minimized to about 0.2 mm or less in current general industrial production. If such a variation is large, a representative value can be obtained by measuring the curvature radii of a sufficiently large number of steel sheets and averaging them. In addition, it is conceivable to change it intentionally for some reason, but the present embodiment does not exclude such a form.

In addition, the method of measuring the inner radius of curvature r of the bent portion 5 is not particularly limited, and for example, the inner radius of curvature r can be measured by performing observation using a commercially available microscope (Nikon ECLIPSE LV150) at a magnification of 200. Specifically, the curvature center point A as shown in FIG. 6 is obtained from the observation result, and for a method of obtaining this, for example, if the intersection of the line segment EF and the line segment DG extended inward on the side opposite to the point B is defined as A, the magnitude of the inner radius of curvature r corresponds to the length of the line segment AC. Here, when the point A and the point B are connected by a straight line, the intersection on an arc DE inner the bent portion 5 is the point C.

In the present embodiment, when the inner radius of curvature r of the bent portion 5 is in a range of 1 mm or more and 5 mm or less and specific grain-oriented electrical steel sheets with a controlled crystal grain size, which will be described below, are used to form a wound core, it is possible to optimize the efficiency of the wound core according to magnetic properties. The inner radius of curvature r of the bent portion 5 is preferably 3 mm or less. In this case, the effects of the present embodiment are more significantly exhibited.

In addition, it is most preferable that all bent portions present in the iron core satisfy the inner radius of curvature r specified in the present embodiment. If there are bent portions that satisfy the inner radius of curvature r of the present embodiment and bent portions that do not satisfy the inner radius of curvature r in the wound core, it is desirable for at least half or more of the bent portions to satisfy the inner radius of curvature r specified in the present embodiment.

Figure 4:
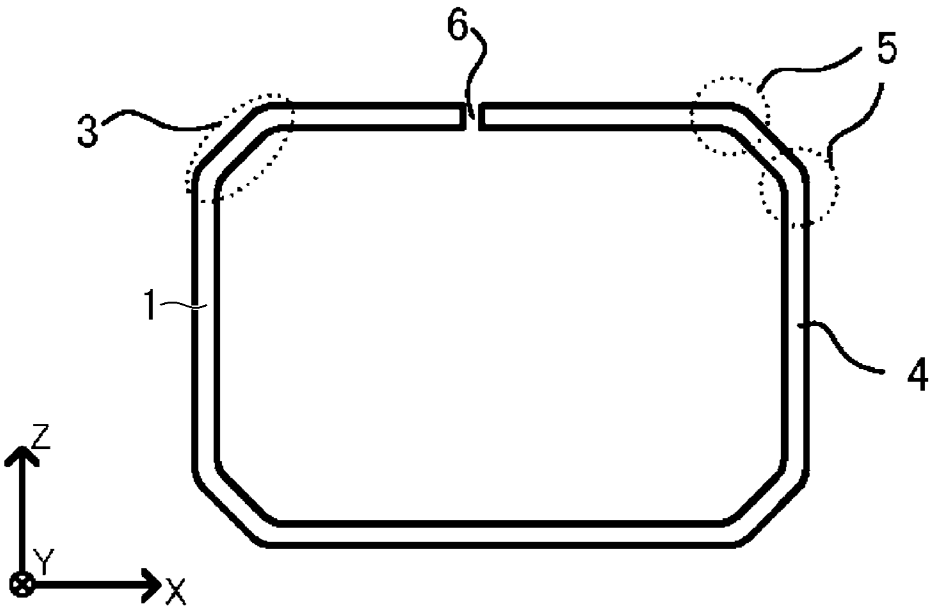
FIG. 4 is a side view schematically showing an example of a single-layer grain-oriented electrical steel sheet constituting a wound core according to the present invention.
Figure 5:
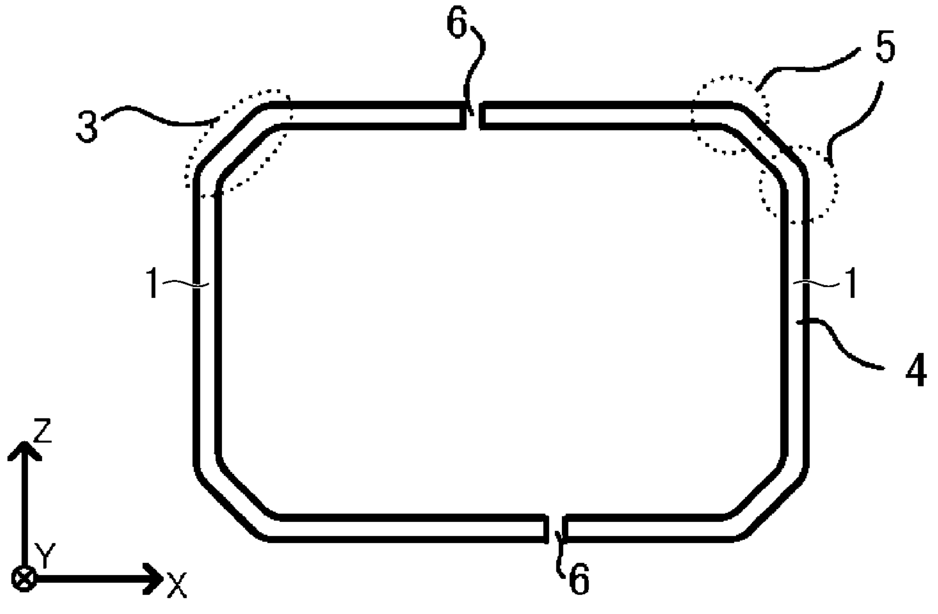
FIG. 5 is a side view schematically showing another example of a single-layer grain-oriented electrical steel sheet constituting the wound core according to the present invention.

FIG. 4 and FIG. 5 are diagrams schematically showing an example of a single-layer grain-oriented electrical steel sheet 1 in the wound core main body 10. As shown in the examples of FIG. 4 and FIG. 5, the grain-oriented electrical steel sheet 1 used in the present embodiment is bent and includes the corner portion 3 composed of two or more bent portions 5 and the first planar portion 4, and forms a substantially rectangular ring in a side view via a joining part 6 that is an end surface of one or more grain-oriented electrical steel sheets 1 in the longitudinal direction.

In the present embodiment, the entire wound core main body 10 may have a substantially rectangular laminated structure 2 in a side view. As shown in the example of FIG. 4, one grain-oriented electrical steel sheet 1 may form one layer of the wound core main body 10 via one joining part 6 (that is, one grain-oriented electrical steel sheet 1 is connected via one joining part 6 for each roll), and as shown in the example of FIG. one grain-oriented electrical steel sheet 1 may form about half the circumference of the wound core, or two grain-oriented electrical steel sheets 1 may form one layer of the wound core main body 10 via two joining parts 6 (that is, two grain-oriented electrical steel sheets 1 are connected to each other via two joining parts 6 for each roll).

The sheet thickness of the grain-oriented electrical steel sheet 1 used in the present embodiment is not particularly limited, and may be appropriately selected according to applications and the like, but is generally within a range of 0.15 mm to 0.35 mm and preferably in a range of 0.18 mm to 0.23 mm.

2. Configuration of Grain-Oriented Electrical Steel Sheet

Next, the configuration of the grain-oriented electrical steel sheet 1 constituting the wound core main body 10 will be described. The present embodiment has features such as the crystal grain size of the planar portions 4 and 4*a* adjacent to the bent portion 5 of the grain-oriented electrical steel sheets laminated adjacently and the arrangement portion of the grain-oriented electrical steel sheet with a controlled crystal grain size in the iron core.

(1) Crystal Grain Size of Planar Portion Adjacent to Bent Portion

In the grain-oriented electrical steel sheet 1 constituting the wound core of the present embodiment, in at least a part of the corner portion, the crystal grain size of the laminated steel sheets is controlled such that it becomes smaller. If the crystal grain size in the vicinity of the bent portion 5 becomes coarse, the effect of avoiding efficiency deterioration in the iron core having an iron core shape in the present embodiment is not exhibited. In other words, when crystal grain boundaries are arranged in the vicinity of the bent portion 5, this indicates that efficiency deterioration is easily minimized.

Although a mechanism by which such a phenomenon occurs is not clear, it is speculated to be as follows.

In the iron core targeted by the present embodiment, macroscopic strain (deformation) due to bending is confined within the bent portion 5 which is a very narrow region. However, when viewed as the crystal structure inside the steel sheet, it is considered that the dislocation formed at the bent portion 5 moves and spreads to the outside of the bent portion 5, that is, the planar portions 4 and 4*a*. In this case, it is considered that, in grain-oriented electrical steel sheets with a crystal grain size of several mm, which are assumed as a material for the iron core of the present embodiment, the crystal grain boundary acts as a strong obstacle to dislocation movement, and dislocation movement is confirmed within a single crystal grain, which can be regarded as one single crystal. That is, it is thought that dislocations are not generated in adjacent crystal grains beyond crystal grain boundaries. It is generally known that lattice defects such as dislocations significantly deteriorate iron loss. Therefore, when the crystal grain size in the vicinity of the bent portion is made fine, and the crystal grain boundary is caused to function as an obstacle (dislocation elimination site) to dislocation movement to the planar portion, it is possible to keep the region with dislocation very close to the bent portion 5. Thereby, it is thought that it is possible to minimize a decrease in iron core efficiency. Such a mechanism of operation of the present embodiment is considered to be a special phenomenon in the iron core having a specific shape targeted by the present embodiment and has so far hardly been considered, but can be interpreted according to the findings obtained by the inventors.

In the present embodiment, the crystal grain size is measured as follows.

Figure 7:
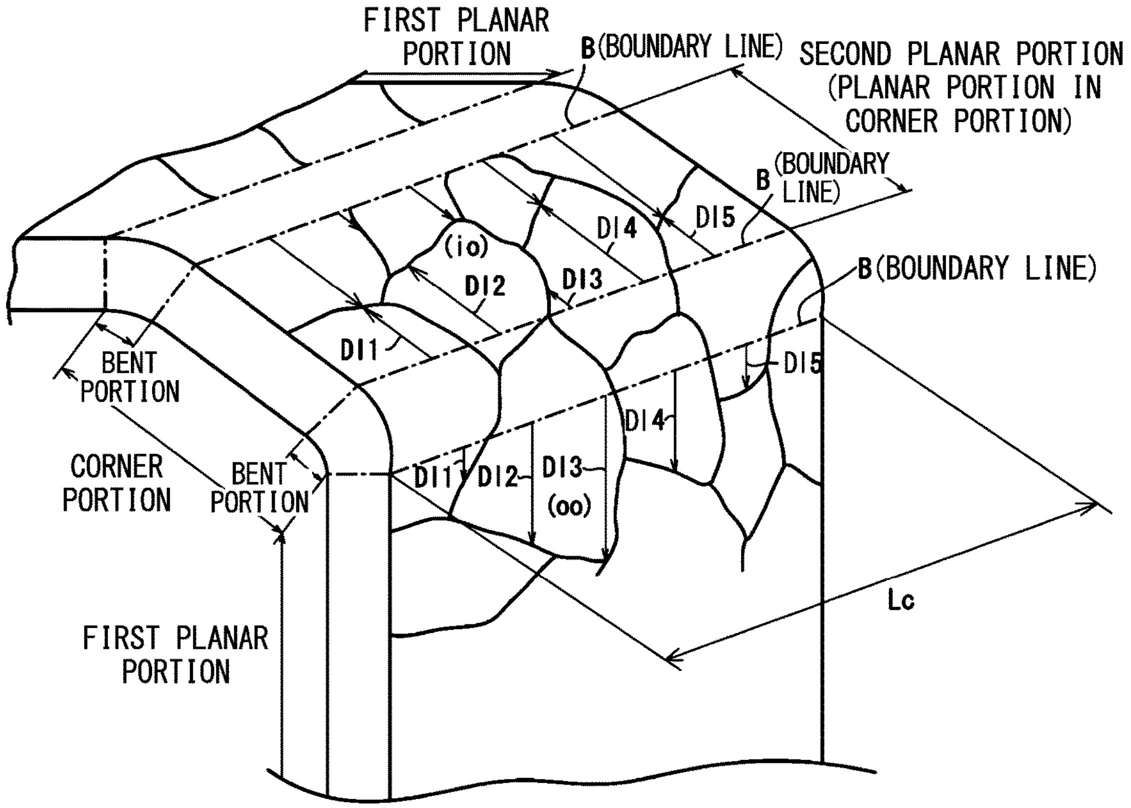
FIG. 7 illustrates a method of measuring a crystal grain size of a grain-oriented electrical steel sheet constituting a wound core according to the present invention, FIG. 7(*a*) is a schematic perspective view of main parts, and FIG. 7(*b*) is a schematic cross-sectional view of main parts.
Figure 7:
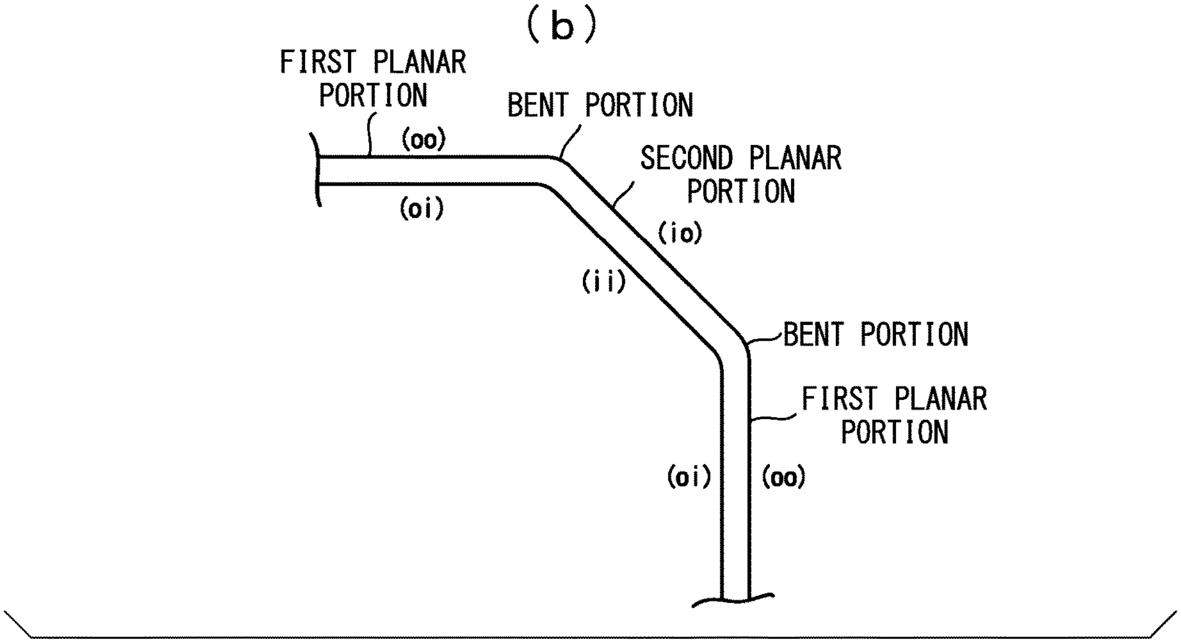

When the steel sheet lamination thickness of the wound core main body 10 is T (corresponding to "L3" shown in FIG. 8), a total of 5 grain-oriented electrical steel sheets laminated at positions of every T/4 including the innermost surface are extracted from the innermost surface of the region including a corner portion of the wound core main body 10. For each of the extracted steel sheets, if a primary coating made of an oxide or the like (a glass coating and an intermediate layer), an insulation coating or the like is provided on the surface of the steel sheet, this coating is removed by a known method, and then as shown in FIG. 7(*a*), the crystal structure of the inner side surface and the outer side surface of the steel sheet is visually observed. Then, at the boundary line B between the bent portion and the planar portion, which is a substantially straight line on each surface, the particle size in the boundary direction (the direction in which the boundary line B extends (the direction perpendicular to the rolling direction of the grain-oriented electrical steel sheet)) and the particle size in the direction perpendicular to the boundary direction (the boundary vertical direction (the rolling direction of the grain-oriented electrical steel sheet)) are measured as follows.

The particle size Dc (mm) in the boundary direction is, for example, as shown in a schematic view of FIG. 7(*a*), obtained by the following Formula (2) when the length of the boundary line B (corresponding to the width of the grain-oriented electrical steel sheet 1 constituting an iron core) is Lc and the number of crystal grain boundaries intersecting the boundary line B is Nc.

$$Dc=Lc/(Nc+1) \tag{2}$$

In addition, for the particle size Dl (mm) in the boundary vertical direction (the direction perpendicular to the boundary direction), in the extension direction of the boundary line B (boundary direction), at five locations excluding the end among positions obtained by dividing Lc into six, distances from the boundary line B between one bent portion 5 and the first planar portion 4 as a starting point until the line extending perpendicular to the boundary line B in a direction of the region of the first planar portion 4 first intersect the crystal grain boundary are defined as Dl1 to Dl5 in the first planar portion 4. In addition, distances from the boundary line B between one bent portion 5 and the second planar portion (planar portion in the corner portion) 4*a* as a starting point until the line extending perpendicular to the boundary line B in a direction of the region of the second planar portion 4*a* first intersects the boundary line B between other adjacent bent portions 5 with the crystal grain boundary or the second planar portion 4*a* therebetween are defined as Dl1 to Dl5 in the second planar portion. For the other bent portion 5, similarly, Dl1 to Dl5 in the first planar portion 4 and the second planar portion 4*a* are obtained. Then, the particle size Dl in the boundary vertical direction is obtained as the average distance of Dl1 to Dl5.

In addition, the circle-equivalent crystal grain size Dp (mm) of the first planar portion 4 and the second planar portion 4*a* adjacent to the bent portion 5 is obtained by the following Formula (1).

$$Dp=\sqrt{(Dc\times Dl/\pi)} \tag{1}$$

In addition, as shown in the schematic view of FIG. 7(*b*), the suffix ii indicates the crystal grain size on the inner side of the second planar portion 4*a*, the suffix io indicates the crystal grain size on the outer side thereof, the suffix oi indicates the crystal grain size on the inner side of the first planar portion 4, and the suffix oo indicates the crystal grain size on the outer side thereof. In this manner, for one bent portion 5, 12 crystal grain sizes (Dcii, Dcio, Dcoi, Dcoo, Dlii, Dlio, Dloi, Dloo, Dpii, Dpio, Dpoi, Dpoo) such as (Dc, Dl, Dp)−(ii, io, oi, oo) are determined. Thus, for two or more bent portions 5 present in each corner portion (for example, two bent portions in the wound core main body 10 shown in FIG. 2, and three bent portions in the wound core main body shown in FIG. 3), the above 12 crystal grain sizes are averaged, and for each corner portion, 12 crystal grain sizes such as (Dc, Dl, Dp)−(ii, io, oi, oo) are determined.

Here, generally, a grain-oriented electrical steel sheet has a crystal grain size having a magnitude of several mm which is very coarse compared to the sheet thickness of the steel sheet. Therefore, in many cases, a single crystal grain penetrates from one surface of the steel sheet (for example, the inner side in the present embodiment) to the other surface (for example, the outer side in the present embodiment) in a columnar shape in observation of the sheet thickness cross section. Therefore, the crystal grain sizes measured on the inner side and the outer side as described above are crystal grain sizes having substantially the same magnitude, but in reality, fine crystal grains that do not penetrate the sheet thickness may remain on the surface layer so that, in the present embodiment, the crystal grain sizes are measured on both surfaces of the steel sheet, and the average value thereof is used to define the wound core of the present embodiment.

In the present embodiment, these crystal grain sizes are defined by comparison with the width W (mm) of the bent portion 5. In the present embodiment, the width W of the bent portion 5 is the average value of the length of the inner surface of the bent portion 5 La (the length in the bending direction) (refer to FIG. 6) and the length of the outer surface of the bent portion 5 Lb (the length in the bending direction) (refer to FIG. 6).

In one embodiment of the present embodiment, in at least one corner portion 3, Dpx≤2 W, where Dpx (mm) is the average value of Dp−(ii, io, oi, oo). This expression corresponds to the basic feature of the mechanism described above. When this expression is satisfied, the crystal grain boundary can function as an obstacle to movement of dislocations generated in the bent portion 5 toward the first planar portion 4 and the second planar portion 4*a*, and as a result, the effects of the present embodiment are exhibited. The reason why the upper limit of Dpx is two times W is that dislocations generated in the bent portion 5 move about twice the deformation region at most, and even if Dpx exceeds 2 W, it is unlikely to become an obstacle to dislocation movement. Preferably, Dpx≤W. In addition, in all of four corner portions present in the wound core main body 10, it is needless to say that it is preferable to satisfy Dpx≤2 W.

As another embodiment, in at least one corner portion 3, Dpy≤2 W, where Dpy (mm) is the average value of Dl−(ii, io, oi, oo). In consideration of the mechanism described above, this expression particularly corresponds to a feature in which crystal grain boundaries that intersect the direction toward the first planar portion 4 and the second planar portion 4*a* (the direction perpendicular to the boundary direction in the bent portion 5) act as obstacles to dislocation movement in the direction of each planar portion more easily than crystal grain boundaries that are parallel to the direction toward the first planar portion 4 and the second planar portion 4*a* (the direction perpendicular to the bent portion boundary). When this expression is satisfied, it is possible to sufficiently minimize movement of dislocations to the planar portion region. Preferably, Dpy≤W. In addition, in all of four corner portions present in the wound core main body 10, it is needless to say that it is preferable to satisfy Dpy≤2 W.

As still another embodiment, in at least one corner portion 3, Dpz≤2·W, where Dpz (mm) is the average value of Dc−(ii, io, oi, oo). This expression corresponds to a feature in which crystal grain boundaries parallel to the direction toward the first planar portion 4 and the second planar portion 4*a* (the direction perpendicular to the bent portion boundary) also easily act as elimination sites for dislocations that move toward the first planar portion 4 and the second planar portion 4*a*. When this expression is satisfied, it is possible to sufficiently minimize movement of dislocations to the planar portion region. Preferably, Dpz≤W. In addition, in all of four corner portions present in the wound core main body 10, it is needless to say that it is preferable to satisfy Dpz≤2 W.

(2) Grain-Oriented Electrical Steel Sheet

As described above, in the grain-oriented electrical steel sheet 1 used in the present embodiment, the base steel sheet is a steel sheet in which crystal grain orientations in the base steel sheet are highly concentrated in the {110}<001> orientation and has excellent magnetic properties in the rolling direction.

A known grain-oriented electrical steel sheet can be used as the base steel sheet in the present embodiment. Hereinafter, an example of a preferable base steel sheet will be described.

The base steel sheet has a chemical composition containing, in mass %, Si: 2.0% to 6.0%, with the remainder being Fe and impurities. This chemical composition allows the crystal orientation to be controlled to the Goss texture concentrated in the {110}<001> orientation and favorable magnetic properties to be secured. Other elements are not particularly limited, but in the present embodiment, in addition to Si, Fe and impurities, elements may be contained as long as the effects of the present invention are not impaired. For example, it is allowed to contain the following elements in the following ranges in place of some Fe. The ranges of the amounts of representative selective elements are as follows.

C: 0 to 0.0050%,
Mn: 0 to 1.0%,
S: 0 to 0.0150%,
Se: 0 to 0.0150%,
Al: 0 to 0.0650%,
N: 0 to 0.0050%,
Cu: 0 to 0.40%,
Bi: 0 to 0.010%,
B: 0 to 0.080%,
P: 0 to 0.50%,
Ti: 0 to 0.0150%,
Sn: 0 to 0.10%,
Sb: 0 to 0.10%,
Cr: 0 to 0.30%,
Ni: 0 to 1.0%,
Nb: 0 to 0.030%,
V: 0 to 0.030%,
Mo: 0 to 0.030%,
Ta: 0 to 0.030%,
W: 0 to 0.030%.

Since these selective elements may be contained depending on the purpose, there is no need to limit the lower limit value, and it is not necessary to substantially contain them. In addition, even if these selective elements are contained as impurities, the effects of the present embodiment are not impaired. In addition, since it is difficult to make the C content 0% in a practical steel sheet in production, the C content may exceed 0%. In addition, here, impurities refer to elements that are unintentionally contained, and elements that are mixed in from raw materials such as ores, scraps, or production environments when the base steel sheet is industrially produced. The upper limit of the total content of impurities may be, for example, 5%.

The chemical component of the base steel sheet may be measured by a general analysis method for steel. For example, the chemical component of the base steel sheet may be measured using Inductively Coupled Plasma-Atomic Emission Spectrometry (ICP-AES). Specifically, for example, a 35 mm square test piece is acquired from the center position of the base steel sheet after the coating is removed, and it can be specified by performing measurement under conditions based on a previously created calibration curve using ICPS-8100 or the like (measurement device) (commercially available from Shimadzu Corporation). Here, C and S may be measured using a combustion-infrared absorption method, and N may be measured using an inert gas fusion-thermal conductivity method.

Here, the above chemical composition is the component of the grain-oriented electrical steel sheet 1 as a base steel sheet. When the grain-oriented electrical steel sheet 1 as a measurement sample has a primary coating made of an oxide or the like (a glass coating and an intermediate layer), an insulating coating or the like on the surface, this coating is removed by a known method and the chemical composition is then measured.

(3) Method of Producing Grain-Oriented Electrical Steel Sheet

The method of producing a grain-oriented electrical steel sheet is not particularly limited, and as will be described below, when production conditions are precisely controlled, the crystal grain size of the steel sheet can be incorporated. When grain-oriented electrical steel sheets having such a desired crystal grain size are used and a wound core is produced under suitable processing conditions to be described below, it is possible to obtain a wound core that can minimize deterioration of iron core efficiency. As a preferable specific example of the production method, for example, first, a slab containing 0.04 to 0.1 mass % of C, with the remainder being the chemical composition of the grain-oriented electrical steel sheet, is heated to 1,000° C. or higher and hot-rolled and then wound at 400 to 850° C. As necessary, hot-band annealing is performed. Hot-band annealing conditions are not particularly limited, and in consideration of precipitate control, the annealing temperature may be 800 to 1,200° C., and the annealing time may be 10 to 1,000 seconds. Then, a cold-rolled steel sheet is obtained by cold-rolling once, twice or more with intermediate annealing. The cold rolling rate in this case may be 80 to 99% in consideration of control of the texture. The cold-rolled steel sheet is heated, for example, in a wet hydrogen-inert gas atmosphere at 700 to 900° C., decarburized and annealed, and as necessary, subjected to nitridation annealing. Then, after an annealing separator is applied to the steel sheet after annealing, finish annealing is performed at a maximum reaching temperature of 1,000° C. to 1,200° C. for 40 to 90 hours, and an insulating coating is formed at about 900° C. Among the above conditions, particularly, the decarburization annealing and finish annealing influence the crystal grain size of the steel sheet. Therefore, when a wound core is produced, it is preferable to use a grain-oriented electrical steel sheet produced within the above condition ranges.

In addition, generally, the effects of the present embodiment can be obtained even with a steel sheet that has been subjected to a treatment called "magnetic domain control" in the steel sheet producing process by a known method.

As above, the crystal grain size, which is a feature of the grain-oriented electrical steel sheet 1 used in the present embodiment, is preferably adjusted depending on, for example, the maximum reaching temperature and the time of finish annealing. When the average crystal grain size of the entire steel sheet is reduced in this manner and each crystal grain size is set to 2 W or less, even if the bent portion 5 is formed at an arbitrary position when a wound core is produced, the above Dpx or the like is expected to be 2 W or less. In addition, in order to produce a wound core in which grains with a small crystal grain size are arranged in the vicinity of the bent portion 5, a method of controlling the bending position of the steel sheet so that a region with a small crystal grain size is arranged in the vicinity of the bent portion 5 is also effective. In this method, a steel sheet in which, when a steel sheet is produced, the grain growth of secondary recrystallization is locally minimized according to a known method such as locally changing the annealing separator state is produced, and bending may be performed by selecting a location that becomes fine grains.

3. Method of Producing Wound Core

The method of producing a wound core according to the present embodiment is not particularly limited as long as the wound core according to the present embodiment can be produced, and for example, a method according to a known wound core introduced in Patent Documents 9 to 11 in the related art may be applied. In particular, it can be said that the method using a production device UNICORE (commercially available from AEM UNICORE) (https://www.aemcores.com.au/technology/Unicore/) is optimal.

In addition, in order to precisely control the above Dpx, Dpy, and Dpz, it is preferable to control the shapes of the punch and the die used during processing and the amount of increase in the steel sheet temperature due to processing heat. Specifically, when the radius of curvature of the punch used is $r_p$ (mm), and the radius of curvature of the die is $r_d$ (mm), $r_p/r_d$ is preferably within a range of 2.0 to 10.0. In addition, when the amount of increase in the steel sheet temperature due to processing heat is set as ΔT, ΔT is preferably reduced to 4.8° C. or less. If ΔT is excessively large, even if a steel sheet having a crystal grain size within an appropriate range is used as a material, the crystal grain size may become coarse and the iron core efficiency of the wound core may be lowered. The cooling method is not particularly limited, but for example, the temperature of the steel sheet may be adjusted by spraying a coolant such as liquid nitrogen during processing or immediately after processing.

In addition, according to a known method, as necessary, a heat treatment may be performed. In addition, the obtained wound core main body 10 may be used as a wound core without change or a plurality of stacked grain-oriented electrical steel sheets 1 may be integrally fixed, as necessary, using a known fastener such as a binding band to form a wound core.

The present embodiment is not limited to the above embodiment. The above embodiment is an example, and any embodiment having substantially the same configuration as the technical idea described in the claims of the present invention and exhibiting the same operational effects is included in the technical scope of the present invention.

EXAMPLES

Hereinafter, technical details of the present invention will be additionally described with reference to examples of the present invention. The conditions in the examples shown below are examples of conditions used for confirming the feasibility and effects of the present invention, and the present invention is not limited to these condition examples. In addition, the present invention may use various conditions without departing from the gist of the present invention as long as the object of the present invention is achieved.

(Grain-Oriented Electrical Steel Sheet)

Using a slab having a chemical composition (mass %, the remainder other than the displayed elements is Fe) shown in Table 1 as a material, a final product (product sheet) having a chemical composition (mass %, the remainder other than the displayed elements is Fe) shown in Table 2 was produced. The width of the obtained steel sheet was 1,200 mm.

In Table 1 and Table 2, "-" means that the element was not controlled or produced with awareness of content and its content was not measured. In addition, "<0.002" and "<0.004" mean that the element was controlled and produced with awareness of content, the content was measured, but sufficient measurement values were not obtained with accuracy credibility (detection limit or less).

TABLE 1

| Steel | Slab | | | | | | | | |
|---|---|---|---|---|---|---|---|---|---|
| type | C | Si | Mn | S | Al | N | Cu | Bi | Nb |
| A | 0.070 | 3.26 | 0.07 | 0.025 | 0.026 | 0.008 | 0.07 | — | — |
| B | 0.070 | 3.26 | 0.07 | 0.025 | 0.026 | 0.008 | 0.07 | — | 0.007 |
| C | 0.070 | 3.26 | 0.07 | 0.025 | 0.025 | 0.008 | 0.07 | 0.002 | — |
| D | 0.060 | 3.45 | 0.10 | 0.006 | 0.027 | 0.008 | 0.20 | — | 0.005 |

TABLE 2

| Steel | Product sheet | | | | | | | | |
|---|---|---|---|---|---|---|---|---|---|
| type | C | Si | Mn | S | Al | N | Cu | Bi | Nb |
| A | 0.001 | 3.15 | 0.07 | <0.002 | <0.004 | <0.002 | 0.07 | — | — |
| B | 0.001 | 3.15 | 0.07 | <0.002 | <0.004 | <0.002 | 0.07 | — | 0.005 |
| C | 0.001 | 3.15 | 0.07 | <0.002 | <0.004 | <0.002 | 0.07 | 0.002 | — |
| D | 0.001 | 3.34 | 0.10 | <0.002 | <0.004 | <0.002 | 0.20 | — | — |

Here, Table 3 shows details of the steel sheet producing process and conditions.

Specifically, and hot rolling, hot-band annealing, and cold rolling were performed. In a part of the cold-rolled steel sheet after decarburization annealing, a nitridation treatment (nitridation annealing) was performed in a mixed atmosphere containing hydrogen-nitrogen-ammonia.

In addition, an annealing separator mainly composed of MgO was applied and finish annealing was performed. An insulating coating application solution containing chromium and mainly composed of phosphate and colloidal silica was applied to a primary coating formed on the surface of the finish-annealed steel sheet, and heated to form an insulating coating.

In this case, the cold rolling rate or the finish annealing time was adjusted and thus steel sheets with a controlled crystal grain size were produced. Table 3 shows details of the produced steel sheets.

TABLE 3

| | | Hot rolling | | | | Hot-band annealing | | Cold rolling | | Decarburization annealing | | | Finish annealing | | | Properties | | |
|---|---|---|---|---|---|---|---|---|---|---|---|---|---|---|---|---|---|---|
| Steel sheet No. | Steel type | Heating temperature ° C. | Finishing temperature ° C. | Winding temperature ° C. | Sheet thickness mm | Temperature ° C. | Time sec | Sheet thickness mm | Cold rolling rate % | Temperature ° C. | Time sec | Nitriding | Temperature ° C. | Time hour | Magnetic domain control | B8 T | Iron loss W/kg | Crystal grain size mm |
| A1 | A | 1150 | 900 | 540 | 3.0 | 1100 | 180 | 0.35 | 88.3 | 830 | 180 | yes | 1100 | 45 | Control | 1.91 | 1.01 | 6 |
| A2 | A | 1150 | 900 | 540 | 3.1 | 1100 | 180 | 0.35 | 88.7 | 830 | 180 | | 1100 | 50 | by | 1.91 | 0.95 | 8 |
| A3 | A | 1150 | 900 | 540 | 3.2 | 1100 | 180 | 0.35 | 89.1 | 830 | 180 | | 1100 | 55 | etching | 1.92 | 0.93 | 13 |
| A4 | A | 1150 | 900 | 540 | 3.3 | 1100 | 180 | 0.35 | 89.4 | 830 | 180 | | 1100 | 60 | | 1.91 | 0.94 | 18 |
| B1 | B | 1150 | 880 | 650 | 2.2 | 1150 | 180 | 0.23 | 89.5 | 850 | 180 | yes | 1100 | 45 | Control | 1.90 | 0.77 | 7 |
| B2 | B | 1150 | 880 | 650 | 2.3 | 1150 | 180 | 0.23 | 90.0 | 850 | 180 | | 1100 | 50 | by | 1.91 | 0.77 | 11 |
| B3 | B | 1150 | 880 | 650 | 2.4 | 1150 | 180 | 0.23 | 90.4 | 850 | 180 | | 1100 | 55 | mech- | 1.92 | 0.72 | 18 |
| B4 | B | 1150 | 880 | 650 | 2.5 | 1150 | 180 | 0.23 | 90.8 | 850 | 180 | | 1100 | 60 | anical | 1.92 | 0.78 | 21 |
| | | | | | | | | | | | | | | | strain | | | |
| C1 | C | 1150 | 900 | 750 | 2.5 | 1100 | 120 | 0.26 | 89.6 | 860 | 180 | yes | 1150 | 55 | Control | 1.90 | 0.81 | 6 |
| C2 | C | 1150 | 900 | 750 | 2.6 | 1100 | 120 | 0.26 | 90.0 | 860 | 180 | | 1150 | 60 | by | 1.92 | 0.79 | 9 |
| C3 | C | 1150 | 900 | 750 | 2.7 | 1100 | 120 | 0.26 | 90.4 | 860 | 180 | | 1150 | 65 | laser | 1.94 | 0.77 | 14 |
| C4 | C | 1150 | 900 | 750 | 2.8 | 1100 | 120 | 0.26 | 90.7 | 860 | 180 | | 1150 | 70 | | 1.93 | 0.83 | 18 |
| D1 | D | 1350 | 930 | 540 | 2.5 | 1050 | 180 | 0.26 | 89.6 | 860 | 180 | no | 1100 | 65 | Control | 1.91 | 0.80 | 5 |
| D2 | D | 1350 | 930 | 540 | 2.6 | 1050 | 180 | 0.26 | 90.0 | 860 | 180 | | 1100 | 70 | by | 1.92 | 0.72 | 8 |
| D3 | D | 1350 | 930 | 540 | 2.7 | 1050 | 180 | 0.26 | 90.4 | 860 | 180 | | 1100 | 75 | elec- | 1.94 | 0.70 | 12 |
| D4 | D | 1350 | 930 | 540 | 2.8 | 1050 | 180 | 0.26 | 90.7 | 860 | 180 | | 1100 | 80 | tron | 1.93 | 0.73 | 16 |
| | | | | | | | | | | | | | | | beam | | | |

(Iron Core)

Figure 8:
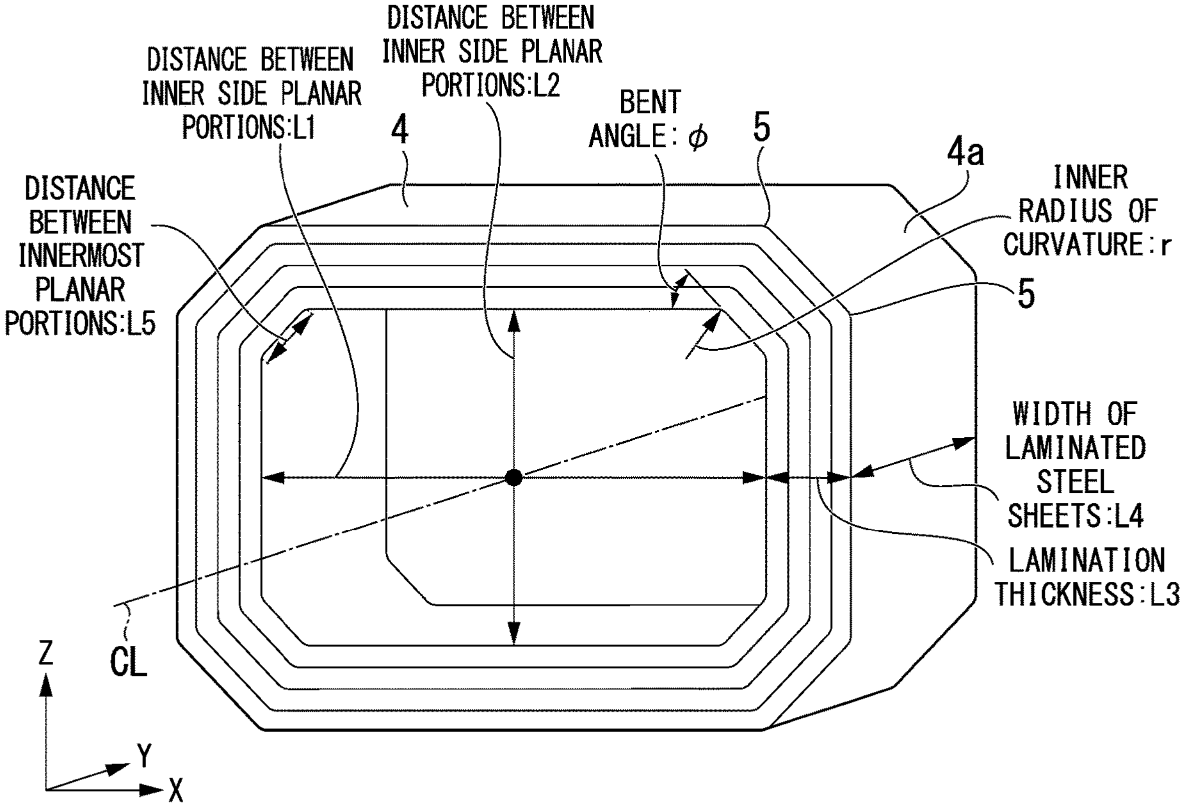
FIG. 8 is a schematic view showing size parameters of wound cores produced in examples and comparative examples.

The cores Nos. a to f of the iron cores having shapes shown in Table 4 and FIG. 8 were produced using respective steel sheets as materials. Here, L1 is parallel to the X-axis direction and is a distance between parallel grain-oriented electrical steel sheets 1 on the innermost periphery of the wound core in a flat cross section including the center CL (a distance between inner side planar portions), L2 is parallel to the Z-axis direction and is a distance between parallel grain-oriented electrical steel sheets 1 on the innermost periphery of the wound core in a vertical cross section including the center CL (a distance between inner side planar portions), L3 is parallel to the X-axis direction and is a lamination thickness of the wound core in a flat cross section including the center CL (a thickness in the laminating direction), L4 is parallel to the X-axis direction and is a width of the laminated steel sheets of the wound core in a flat cross section including the center CL, and L5 is a distance between planar portions that are adjacent to each other in the innermost portion of the wound core and arranged to form a right angle together (a distance between bent portions). In other words, L5 is a length of the planar portion 4*a* in the longitudinal direction having the shortest length among the planar portions 4 and 4*a* of the grain-oriented electrical steel sheets on the innermost periphery. r is the radius of curvature (mm) of the bent portion on the inner side of the wound core, and φ is the bent angle)(°) of the bent portion of the wound core. The cores Nos. a to f of the substantially rectangular iron cores have a structure in which a planar portion with an inner side planar portion distance of L1 is divided at approximately in the center of the distance L1 and two iron cores having "substantially a U-shape" are connected.

Here, the iron core of the core No. f is conventionally used as a general wound core and is a so-called trunk core type iron core produced by a method of winding a steel sheet into a cylindrical, then pressing the cylindrical laminated body without change so that the corner portion has a constant curvature, forming it into a substantially rectangular shape, and then performing annealing, and maintaining the shape. Therefore, the radius of curvature of the bent portion varies greatly depending on the lamination position of the steel sheet. In addition, in Table 4, the radius of curvature r (mm) of the core No. f increases toward the outside, and is 6 mm at the innermost periphery part and about 85 mm at the outermost periphery part (indicated by "-" in Table 4).

TABLE 4

| | Core shape | | | | | | |
|---|---|---|---|---|---|---|---|
| Core No. | L1 mm | L2 mm | L3 mm | L4 mm | L5 mm | r mm | φ ° |
| a | 197 | 66 | 45 | 150 | 16 | 1 | 45 |
| b | 197 | 66 | 45 | 150 | 18 | 3 | 45 |
| C | 197 | 66 | 45 | 150 | 20 | 5 | 45 |
| d | 197 | 66 | 55 | 150 | 20 | 2 | 30 |
| e | 197 | 66 | 55 | 150 | 22 | 6 | 45 |
| f | 197 | 66 | 55 | 150 | — | 30 | 90 |

(Evaluation Method)

(1) Magnetic Properties of Grain-Oriented Electrical Steel Sheet

The magnetic properties of the grain-oriented electrical steel sheet were measured based on a single sheet magnetic property test method (Single Sheet Tester: SST) specified in JIS C 2556: 2015.

As the magnetic properties, the magnetic flux density B8(T) of the steel sheet in the rolling direction when excited at 800 A/m and the iron loss of the steel sheet at an AC frequency of 50 Hz and an excitation magnetic flux density of 1.7 T were measured.

(2) Particle Size in Iron Core 12 crystal grain sizes (Dcii, Dcio, Dcoi, Dcoo, Dlii, Dlio, Dloi, Dloo, Dpii, Dpio, Dpoi, and Dpoo) were determined by observing both surfaces of the steel sheet extracted from the iron core as described above.

(3) Efficiency of Iron Core

The building factor (BF) was obtained by calculating the non-load loss for the iron core formed of each steel sheet as a material and taking a ratio with the magnetic properties of the steel sheet obtained in (1). Here, the BF is a value obtained by dividing the iron loss value of the wound core by the iron loss value of the grain-oriented electrical steel sheet which is a material of the wound core. A smaller BF indicates a lower iron loss of the wound core with respect to the material steel sheet. Here, in this example, when the BF was 1.15 or less, it was evaluated that deterioration of iron loss efficiency was minimized.

The efficiency was evaluated for various iron cores produced using various steel sheets with different magnetic domain widths. The results are shown in Table 5. Here, in Table 5, "$r_p/r_d$" represents a ratio of the radius of curvature $r_p$ (mm) of the punch and the radius of curvature $r_d$ (mm) of the die used when the iron core was processed, and "ΔT" represents the amount of increase (° C.) in the steel sheet temperature due to heat generated during processing.

It can be understood that the efficiency of the iron core could be improved by appropriately controlling the crystal grain size even if the same steel type was used.

TABLE 5

| | Steel | | Processing conditions | | Iron core properties | | | | | |
|---|---|---|---|---|---|---|---|---|---|---|
| Test No. | sheet No. | Core No. | $r_p/r_d$ | ΔT (° C.) | W mm | Dpx mm | Dpy mm | Dpy mm | Building factor | Note |
| 1-1 | A1 | a | 6.3 | 0.7 | 0.98 | 0.97 | 1.72 | 1.65 | 1.08 | Example of invention |
| 1-2 | A2 | a | 5.2 | 1.0 | 0.98 | 1.15 | 1.82 | 2.04 | 1.11 | Example of invention |
| 1-3 | A3 | a | 1.4 | 6.7 | 0.98 | 2.30 | 4.05 | 3.71 | 1.17 | Comparative Example |
| 1-4 | A4 | a | 1.7 | 5.7 | 0.98 | 3.18 | 4.53 | 4.91 | 1.18 | Comparative Example |
| 1-5 | B1 | a | 4.6 | 1.3 | 0.98 | 0.95 | 1.57 | 1.41 | 1.08 | Example of invention |
| 1-6 | B2 | a | 10.0 | 0.8 | 0.98 | 1.55 | 2.45 | 2.88 | 1.14 | Example of invention |
| 1-7 | B3 | a | 1.2 | 5.2 | 0.98 | 3.08 | 4.82 | 4.96 | 1.18 | Comparative Example |
| 1-8 | B4 | a | 0.7 | 6.1 | 0.98 | 3.41 | 5.44 | 5.69 | 1.19 | Comparative Example |
| 1-9 | C1 | a | 2.0 | 2.2 | 0.98 | 1.03 | 1.72 | 1.64 | 1.09 | Example of invention |
| 1-10 | C2 | a | 3.4 | 1.7 | 0.98 | 1.38 | 2.41 | 1.95 | 1.10 | Example of invention |
| 1-11 | C3 | a | 0.8 | 6.7 | 0.98 | 2.10 | 3.87 | 3.46 | 1.18 | Comparative Example |
| 1-12 | C4 | a | 1.3 | 7.8 | 0.98 | 2.87 | 5.27 | 4.61 | 1.19 | Comparative Example |
| 1-13 | D1 | a | 8.6 | 4.8 | 0.98 | 0.73 | 1.15 | 1.21 | 1.07 | Example of invention |
| 1-14 | D2 | a | 6.7 | 0.3 | 0.98 | 1.10 | 2.08 | 1.61 | 1.11 | Example of invention |
| 1-15 | D3 | a | 9.3 | 1.6 | 0.98 | 1.93 | 3.05 | 3.35 | 1.13 | Example of invention |
| 1-16 | D4 | a | 1.7 | 5.5 | 0.98 | 2.91 | 4.68 | 4.20 | 1.18 | Comparative Example |
| 1-17 | A1 | b | 8.4 | 2.0 | 1.76 | 0.98 | 1.53 | 1.74 | 1.07 | Example of invention |
| 1-18 | A4 | b | 6.7 | 0.3 | 1.76 | 3.22 | 4.67 | 5.26 | 1.15 | Example of invention |
| 1-19 | B1 | b | 9.3 | 1.6 | 1.76 | 0.94 | 1.66 | 1.39 | 1.06 | Example of invention |

TABLE 5-continued

| Test No. | Steel sheet No. | Core No. | Processing conditions $r_p/r_d$ | Processing conditions ΔT (° C.) | Iron core properties W mm | Iron core properties Dpx mm | Iron core properties Dpy mm | Iron core properties Dpy mm | Iron core properties Building factor | Note |
|---|---|---|---|---|---|---|---|---|---|---|
| 1-20 | B4 | b | 6.7 | 1.9 | 1.76 | 3.55 | 5.37 | 6.34 | 1.19 | Comparative Example |
| 1-21 | C1 | c | 2.0 | 2.2 | 2.61 | 1.15 | 1.89 | 1.64 | 1.05 | Example of invention |
| 1-22 | C4 | c | 3.4 | 1.7 | 2.61 | 3.13 | 5.04 | 5.45 | 1.11 | Example of invention |
| 1-23 | D1 | d | 2.0 | 0.6 | 1.21 | 0.87 | 1.49 | 1.24 | 1.08 | Example of invention |
| 1-24 | D4 | d | 1.5 | 5.0 | 1.21 | 2.58 | 4.13 | 5.01 | 1.18 | Comparative Example |
| 1-25 | C1 | e | 2.0 | 2.2 | 3.32 | 1.01 | 1.74 | 1.80 | 1.18 | Comparative Example |
| 1-26 | C3 | e | 3.4 | 1.7 | 3.32 | 2.13 | 3.71 | 3.82 | 1.17 | Comparative Example |
| 1-27 | D1 | e | 0.8 | 6.7 | 3.32 | 0.83 | 1.37 | 1.29 | 1.18 | Comparative Example |
| 1-28 | D3 | e | 1.3 | 7.8 | 3.32 | 1.92 | 3.31 | 3.12 | 1.16 | Comparative Example |
| 1-29 | A1 | f | 8.6 | 2.0 | 47.33 | 1.06 | 1.81 | 1.72 | 1.16 | Comparative Example |
| 1-30 | A3 | f | 6.7 | 0.3 | 47.33 | 2.20 | 4.12 | 3.88 | 1.16 | Comparative Example |
| 1-31 | B1 | f | 9.3 | 1.6 | 47.33 | 0.88 | 1.55 | 1.43 | 1.17 | Comparative Example |
| 1-32 | B3 | f | 6.7 | 0.3 | 47.33 | 2.66 | 4.68 | 4.83 | 1.18 | Comparative Example |

Based on the above results, it can be clearly understood that, in the wound core of the present invention, the crystal grain sizes Dpx, Dpy and Dpz of the laminated grain-oriented electrical steel sheet each were 2 W or less so that the wound core had low iron loss properties.

INDUSTRIAL APPLICABILITY

According to the present invention, in the wound core formed by laminating bent steel sheets, it is possible to effectively minimize deterioration of efficiency of the iron core.

BRIEF DESCRIPTION OF THE REFERENCE SYMBOLS

1 Grain-oriented electrical steel sheet

2 Laminated structure

3 Corner portion

4 First planar portion (planar portion)

**4*a*** Second planar portion (planar portion)

5 Bent portion

6 Joining part

10 Wound core main body

The invention claimed is:

1. A wound core including a wound core main body obtained by laminating a plurality of polygonal annular grain-oriented electrical steel sheets in a sheet thickness direction in a side view, wherein the grain-oriented electrical steel sheet has planar portions and bent portions that are alternately continuous in a longitudinal direction, wherein the bent portion in a side view has an inner radius of curvature r of 1 mm or more and 5 mm or less, wherein the grain-oriented electrical steel sheets have a chemical composition containing, in mass %, Si: 2.0 to 7.0%, with the remainder comprising Fe and impurities, and have a texture oriented in the Goss orientation, and in at least one of the bent portions, the crystal grain size Dpx (mm) of the laminated grain-oriented electrical steel sheet is 2W or less, where Dpx (mm) is an average value of Dp (mm) obtained by the following Formula (1), Dc (mm) is an average crystal grain size in a direction in which a boundary line extends at respective boundaries between the bent portion and two planar portions arranged with the bent portion therebetween, Dl (mm) is an average crystal grain size in a direction perpendicular to a direction in which the boundary line extends at the boundary, W (mm) is the width of the bent portion in a side view, and the average value of Dp is an average value of Dp on the inner side and Dp on the outer side of one planar portion between two planar portions and Dp on the inner side and Dp on the outer side of the other planar portion:

$$Dp=\sqrt{(Dc\times Dl/\pi)} \quad (1).$$

2. A wound core including a wound core main body obtained by laminating a plurality of polygonal annular grain-oriented electrical steel sheets in a sheet thickness direction in a side view, wherein the grain-oriented electrical steel sheet has planar portions and bent portions that are alternately continuous in a longitudinal direction, wherein the bent portion in a side view has an inner radius of curvature r of 1 mm or more and 5 mm or less, wherein the grain-oriented electrical steel sheets have a chemical composition containing, in mass %, Si: 2.0 to 7.0%, with the remainder comprising Fe and impurities, and have a texture oriented in the Goss orientation, and in at least one of the bent portions, the crystal grain size Dpy (mm) of the laminated grain-oriented electrical steel sheet is 2W or less, where Dpy is an average value of DI, Dl (mm) is an average crystal grain size in a direction perpendicular to a direction in which a boundary line extends at respective boundaries between the bent portion and two planar portions arranged with the bent portion therebetween, W (mm) is the width of the bent portion in a side view, and the average value of DI is an average value of DI on the inner side and DI on the outer side of one planar portion between two planar portions and DI on the inner side and DI on the outer side of the other planar portion.

3. A wound core including a wound core main body obtained by laminating a plurality of polygonal annular grain-oriented electrical steel sheets in a sheet thickness direction in a side view, wherein the grain-oriented electrical steel sheet has planar portions and bent portions that are alternately continuous in a longitudinal direction, wherein the bent portion in a side view has an inner radius of curvature r of 1 mm or more and 5 mm or less, wherein the grain-oriented electrical steel sheets have a chemical composition containing, in mass %, Si: 2.0 to 7.0%, with the remainder comprising Fe and impurities, and have a texture oriented in the Goss orientation, and in at least one of the bent portions, the crystal grain size Dpz (mm) of the laminated grain-oriented electrical steel sheet is 2W or less, where Dpz is an average value of Dc, Dc (mm) is an average crystal grain size in a direction in which a boundary line extends at respective boundaries between the bent portion and two planar portions arranged with the bent portion therebetween, W (mm) is the width of the bent portion in a side view, and the average value of Dc is an average value of Dc on the inner side and Dc on the outer side of one planar portion between two planar portions and Dc on the inner side and Dp on the outer side of the other planar portion.

* * * * *